UNITED STATES PATENT OFFICE.

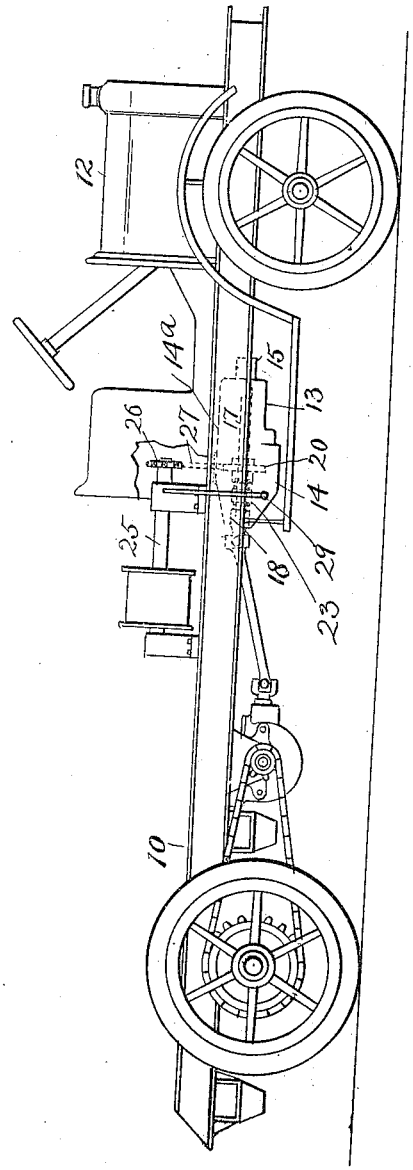

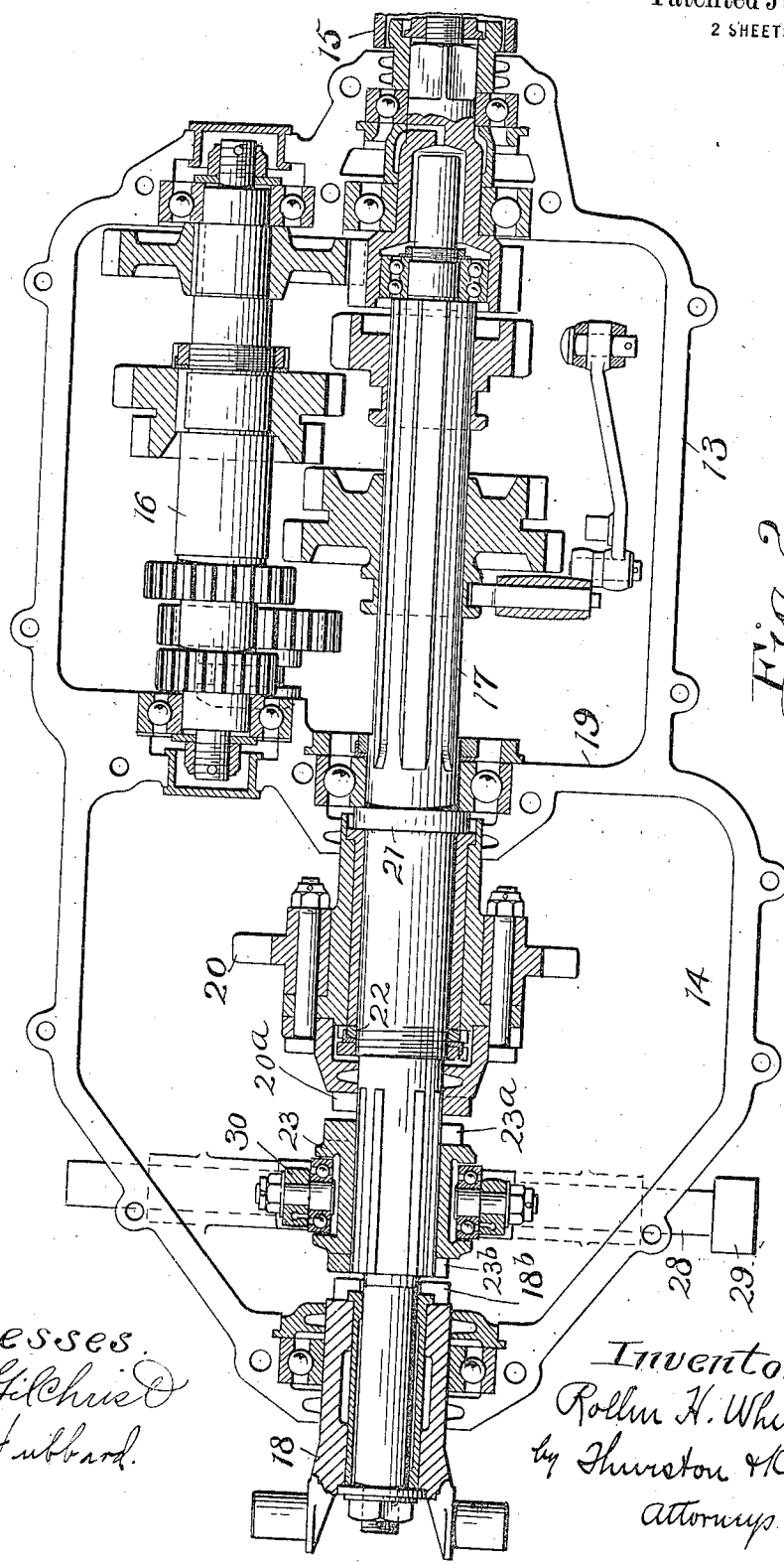

ROLLIN H. WHITE, OF CLEVELAND HEIGHTS VILLAGE, OHIO, ASSIGNOR, BY MESNE ASSIGNMENTS, TO THE WHITE MOTOR COMPANY, OF CLEVELAND, OHIO, A CORPORATION OF OHIO.

MOTOR-VEHICLE.

1,268,411.     Specification of Letters Patent.     Patented June 4, 1918.

Application filed February 24, 1913. Serial No. 750,174.

*To all whom it may concern:*

Be it known that I, ROLLIN H. WHITE, a citizen of the United States, residing at Cleveland Heights Village, in the county of Cuyahoga and State of Ohio, have invented a certain new and useful Improvement in Motor-Vehicles, of which the following is a full, clear, and exact description.

This invention relates to certain novel means through which the same motor which is primarily provided for propelling a motor vehicle may be utilized when the vehicle is standing still to furnish power by which to drive backward or at various speed ratios forward a utility shaft mounted on the vehicle frame.

An object of the invention is to provide mechanism of the sort specified in such form that it may be combined coöperatively with transmission mechanism such as is ordinarily employed for transmitting motion from the engine shaft to the vehicle propelling mechanism.

The invention specifically consists in a power transmitting member which is rotatably mounted on a rearward projection of the driven shaft of the transmission mechanism, a universal joint member which is coaxial with but is rotatable relatively to the same driven shaft, a clutch by means of which either of these two parts may be connected with said driven shaft and may thereby be turned backward or forward at either of several rates, combined with a utility shaft rotatably mounted upon the chassis frame, and means for transmitting motion to said utility shaft from the power transmitting member which is rotatably mounted upon the driven transmission shaft.

In the drawing, Figure 1 is a side elevation of a motor vehicle chassis, which is equipped with the present invention. Fig. 2 is a sectional plan view of suitable transmission mechanism and the adjunctive mechanism which embodies the present invention.

In the embodiment of the invention shown, 10 represents the chassis frame of a motor vehicle. It will be understood that the motor is beneath the hood 12. The so-called transmission mechanism is mounted in a gear case 13 which is supported upon said chassis frame in the usual way. The transmission mechanism in this gear case 13 includes the rotatable driving member 15, the axially alined driven shaft 17, and the intermediate shaft 16. Those familiar with this art will understand that the driving member 15 has a suitable driving connection with the crank shaft of the motor.

This transmission mechanism includes a number of fixed and movable gears adapted for being meshed in various combinations such that the driven shaft 17 may turn backward relative to the driving member 15, or may be turned at various speeds relative to said driving member and in the same direction. It is not thought necessary to more specifically describe the transmission mechanism shown. The specific form, as shown, is such as has been in use for several years on the White motor cars. There are, however, a large number of specific constructions of transmission mechanism well known in this art and in common use which will serve equally well.

Prior to this invention the construction in most general use is such that there is rigidly and permanently attached to the rear end of the driven transmission shaft 17 one member of a universal joint coupling, through which said shaft is connected with the propeller shaft or tongue member which transmits power to the differential mechanism which is usually located in the rear axle.

In the present invention, however, this universal joint member 18 is not rigidly connected with the driven transmission shaft 17, but is mounted coaxially with said transmission shaft in anti-friction bearings secured in the rear end of a supplemental gear case 14 which is formed rigidly with the main gear case 13 and lies behind the same. The driven transmission shaft 17 is extended rearward entirely across this supplemental casing 14. It is mounted in bearings secured in the partition 19 which separates the two gear cases. At its rear end it projects into and is rotatably mounted in the tubular universal joint member 18.

Rotatably mounted on the rearward prolongation of shaft 17, and within the casing 14, is a power transmitting member 20 which is in the form of a sprocket wheel having a long hub. This hub lies between shoulders 21 and 22, fixed to shaft 17, so that endwise movement of the power transmitting member on shaft 17 is prevented. A double ended jaw clutch 23 lies between the universal joint member 18 and the power transmitting member 20. It embraces and is movable lengthwise upon shaft 17 and has longitudinally extended tongue and groove connections therewith. This clutch sleeve may occupy a position such that it does not engage either of the members 18 or 20. If moved forward, however, the jaws 23ª on its front end will interlock with jaws 20ª on the power transmitting member 20 and thereby connect it with shaft 17. If moved rearward the jaws 23ᵇ on its rear end will interlock with jaws 18ᵇ on the front end of the universal joint member 18 and thereby this member will be connected with shaft 17.

25 represents a shaft which, because of the many uses to which it may be put, I term a utility shaft. It is parallel with shaft 17 and is mounted in bearings secured to the chassis frame 10. In the construction shown a sprocket wheel 26 is connected with it; and a chain belt 27 engages with this sprocket wheel and with the sprocket wheel 20; passing through holes in the cap 14ª of the case 14.

It is evident from the foregoing description that when it is desired to propel the vehicle the universal joint member 18 will be connected with shaft 17 through the operation of the clutch 23, and in that event the power transmission member 20 and the utility shaft 25 will not rotate. When, however, it is desired to drive this utility shaft, the clutch member 23 is shifted so as to connect the power transmission member 20 with shaft 17.

It is obvious therefore that this power transmission member 20 and therefore the utility shaft may be turned backward relative to the engine shaft or forward at either of several speed ratios as may be best suited to accomplish the work for which the utility shaft is provided. In a copending application, filed Oct. 19, 1912, Serial No. 726,613, for dumping trucks, this utility shaft is shown in the form of a screw which is utilized to tilt a dumping body; in the drawing of this case a rope drum is shown secured to this shaft; but obviously there are scores of special purposes for which such a power driven utility shaft may be used; and it and the parts secured to and operated thereby may be of such form as is suitable for the special purposes for which they are provided.

A transverse rock shaft 28 is mounted in the casing 14 and projects out of the same; and an operating hand lever 29 is fixed to the projecting end. Within the casing this rock shaft has secured to it the fork 30 to engage in the annular groove in the clutch member 23 so that the latter may be moved.

Having described my invention, I claim:

1. In a motor vehicle, the combination with the frame thereof of a transmission gear case supported on said frame, transmission mechanism in said case, the terminal driven shaft of said mechanism being extended rearward through the rear wall of said case and being mounted in bearings supported by said rear wall, a supplemental case behind the transmission gear case and rigidly connected therewith, a universal joint member rotatably mounted in bearings supported by the rear wall of the supplemental case and axially alined with said driven transmission shaft, a power transmitting member which is rotatably mounted upon said driven shaft within the supplemental gear case, a clutch mounted on said driven shaft within the supplemental case and adapted to connect with said driven shaft either the universal joint member or the power transmitting member, and mechanism supported by said supplemental case for operating said clutch.

2. In a motor vehicle, the combination of a vehicle frame, a transmission gear case secured thereto which comprises a main gear case and a supplemental gear case behind the main gear case and separated therefrom by a partition, transmission mechanism in the main gear case having a terminal driven member which is extended rearward across the supplemental gear case, a bearing in the partition between said gear cases in which said shaft is rotatably mounted, a tubular universal joint member rotatably mounted in the rear end of the supplemental gear case, and serving as a bearing for the rear end of said driven shaft, a power transmission member rotatably mounted on said driven shaft within the supplemental gear case, a clutch within the supplemental gear case adapted to connect either said power transmission member or the universal joint member with said driven shaft, vehicle propelling mechanism operatively connected with the universal joint member, a utility shaft mounted on the vehicle frame, and mechanism transmitting motion thereto from the power transmitting member on said driven shaft.

In testimony whereof, I hereunto affix my signature in the presence of two witnesses.

ROLLIN H. WHITE.

Witnesses:
AUSTIN D. THOMAS,
A. THOMSON.